US010124682B2

(12) United States Patent
Tsuchiya (10) Patent No.: US 10,124,682 B2
(45) Date of Patent: Nov. 13, 2018

(54) CHARGE CONTROL SYSTEM (71) Applicant: TOYOTA JIDOSHA KABUSHIKI KAISHA, Toyota-shi, Aichi-ken (JP)

(72) Inventor: Yoshiyuki Tsuchiya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 29 days.

(21) Appl. No.: 15/229,682

(22) Filed: Aug. 5, 2016

(65) Prior Publication Data
US 2017/0050527 A1 Feb. 23, 2017

(30) Foreign Application Priority Data
Aug. 20, 2015 (JP) ................... 2015-162767

(51) Int. Cl.
*H02J 7/00* (2006.01)
*B60L 11/18* (2006.01)

(52) U.S. Cl.
CPC ......... *B60L 11/1816* (2013.01); *B60L 11/182* (2013.01); *B60L 11/1803* (2013.01); *Y02T 10/7005* (2013.01)

(58) Field of Classification Search
USPC ....................................................... 320/109
See application file for complete search history.

(56) References Cited

U.S. PATENT DOCUMENTS

2012/0245750 A1* 9/2012 Paul ...................... G06Q 50/06 700/291
2013/0257387 A1 10/2013 Yokoyama et al.
2013/0261953 A1* 10/2013 Kiyama ............. G01C 21/3469 701/400
2013/0274972 A1* 10/2013 Kusumi .................. B60L 1/003 701/22
2013/0339072 A1* 12/2013 Touge .................... G06Q 10/00 705/5
2015/0158393 A1* 6/2015 Kawano .................. B60L 11/18 320/109
2015/0294228 A1* 10/2015 Saito ...................... G06Q 50/06 706/48

FOREIGN PATENT DOCUMENTS

JP 2011-083166 A 4/2011
JP 2013-215084 A 10/2013

OTHER PUBLICATIONS

U.S. Appl. No. 15/162,170, filed May 23, 2016.

* cited by examiner

Primary Examiner — Samuel Berhanu
(74) Attorney, Agent, or Firm — Oliff PLC (57) ABSTRACT

A charge control system creates a charge schedule for charging a power storage device installed on a vehicle. The power storage device is charged from a power supply located outside the vehicle. The vehicle is configured to allow charging of the power storage device from the power supply at a plurality of charging sites. The charge control system includes a learning unit and a creating unit. The learning unit is configured to learn a stay period of the vehicle for each of the charging sites. The creating unit is configured to estimate a departure time of the vehicle when the vehicle stays at any one of the charging sites, and create the charge schedule according to the departure time.

5 Claims, 9 Drawing Sheets

< VEHICLE INFORMATION OBTAINING AND MANAGING UNIT >

| NAME OF INFORMATION | CONTENT |
|---|---|
| VEHICLE STAY INFORMATION | ARRIVAL TIME AT CHARGING SITE (CHARGING STATION), DEPARTURE TIME, ETC. |
| VEHICLE CURRENT POSITION INFORMATION | GPS INFORMATION, NAVIGATION SERACH INFORMATION, ETC. |
| CHARGE AMOUNT INFORMATION | STORAGE CAPACITY, SOC, OCV, ETC. |

FIG. 5

< STAY PERIOD LEARNING UNIT >

| GROUP A | CHARGE AT HOME | E.G.) PRIVATE HOUSE, CONDOMINIUM PARKING LOT, ETC. |
|---|---|---|
| GROUP B | CHARGE AT DESTINATION | E.G.) COMMERCIAL FACILITY, THEME PARK, ETC. |
| GROUP C | CHARGE ON PATHWAY (TEMPORARY STAY) | E.G.) SERVICE AREA, CONVENIENCE STORE, GAS STATION, ETC. |

CHARGE CONTROL SYSTEM

INCORPORATION BY REFERENCE

The disclosure of Japanese Patent Application No. 2015-162767 filed on Aug. 20, 2015 including the specification, drawings and abstract is incorporated herein by reference in its entirety.

BACKGROUND

1. Technical Field

The present disclosure relates to a charge control system, and in particular to a charge control system that creates a charge schedule for charging a power storage device installed on a vehicle, by use of a power supply located outside the vehicle.

2. Description of Related Art

Japanese Patent Application Publication No. 2013-215084 (JP 2013-215084 A) discloses a charge control system for controlling electric charge for an electric vehicle or a plug-in hybrid vehicle. In the charge control system, the tendencies of behaviors of the vehicle depending on charge, including the traveling distance, ignition-on (IG-ON) time, departure time, and a period of time for which the vehicle stays at home, are estimated. Then, a charge schedule of the vehicle is set, using the estimated tendencies of behaviors of the vehicle. With the charge control system, an appropriate charge schedule can be set, even if the user has a poor understanding of the behaviors of the vehicle (see JP 2013-215084 A).

When a vehicle-mounted power storage device can be charged by use of a power supply outside the vehicle (which will also be called "external power supply"), at a plurality of charging sites (for example, when charging is performed not only at home but also outside the home), a period of time from arrival of the vehicle at each of the charging sites to its departure varies from one charging site to another; therefore, the accuracy of the charge schedule may be reduced.

The charge control system described in JP 2013-215084 A is useful since it can set the charge schedule of the vehicle, using the learned tendencies of behaviors of the vehicle. However, the problem of reduction in the accuracy of the charge schedule, which may occur when charging of the power storage device is performed at a plurality of charging sites, has not been particularly studied.

SUMMARY

The present disclosure has been developed so as to solve the above problem, and its object is to provide a charge control system capable of improving the accuracy of a charge schedule.

According to the present disclosure, a charge control system creates a charge schedule for charging a power storage device installed on a vehicle, from a power supply located outside the vehicle. The vehicle being is configured to allow charging of the power storage device from the power supply at a plurality of charging sites. The charge control system includes a learning unit and a creating unit. The learning unit is configured to learn a stay period of the vehicle for each of the charging sites. The creating unit is configured to estimate a departure time of the vehicle when the vehicle stays at any one of the plurality of charging sites, and create the charge schedule according to the departure time. The departure time is estimated from a learning result of the stay period associated with the charging site at which the vehicle stays, and an arrival time of the vehicle.

According to the present disclosure, the stay period of the vehicle is learned for each charging site. Then, when the vehicle stays at any of the plurality of charging sites, the departure time of the vehicle is estimated, using a learning result associated with the charging site. Thus, the departure time for each charging site can be estimated with high accuracy. Accordingly, with the present disclosure, the accuracy of the charge schedule for each charging site can be improved.

The charge control system may include an obtaining unit configured to obtain current position information of the vehicle. Then, the creating unit may be configured to create a command to permit charging of the power storage device from the power supply without creating the charge schedule, when a stay location of the vehicle indicated by the current position information is a temporary charging site. The temporary charging site is a charging site that the vehicle is supposed to stay temporarily.

With the above configuration, it is possible to avoid a situation where charging using an external power supply has not been started at the time of departure of the vehicle, at any of the charging sites at which the vehicle is supposed to stay temporarily.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Some embodiments will be described in detail with reference to the drawings. In the drawings, the same reference numerals are assigned to the same or corresponding components or portions, of which explanation will not be repeated.

Figure 1:
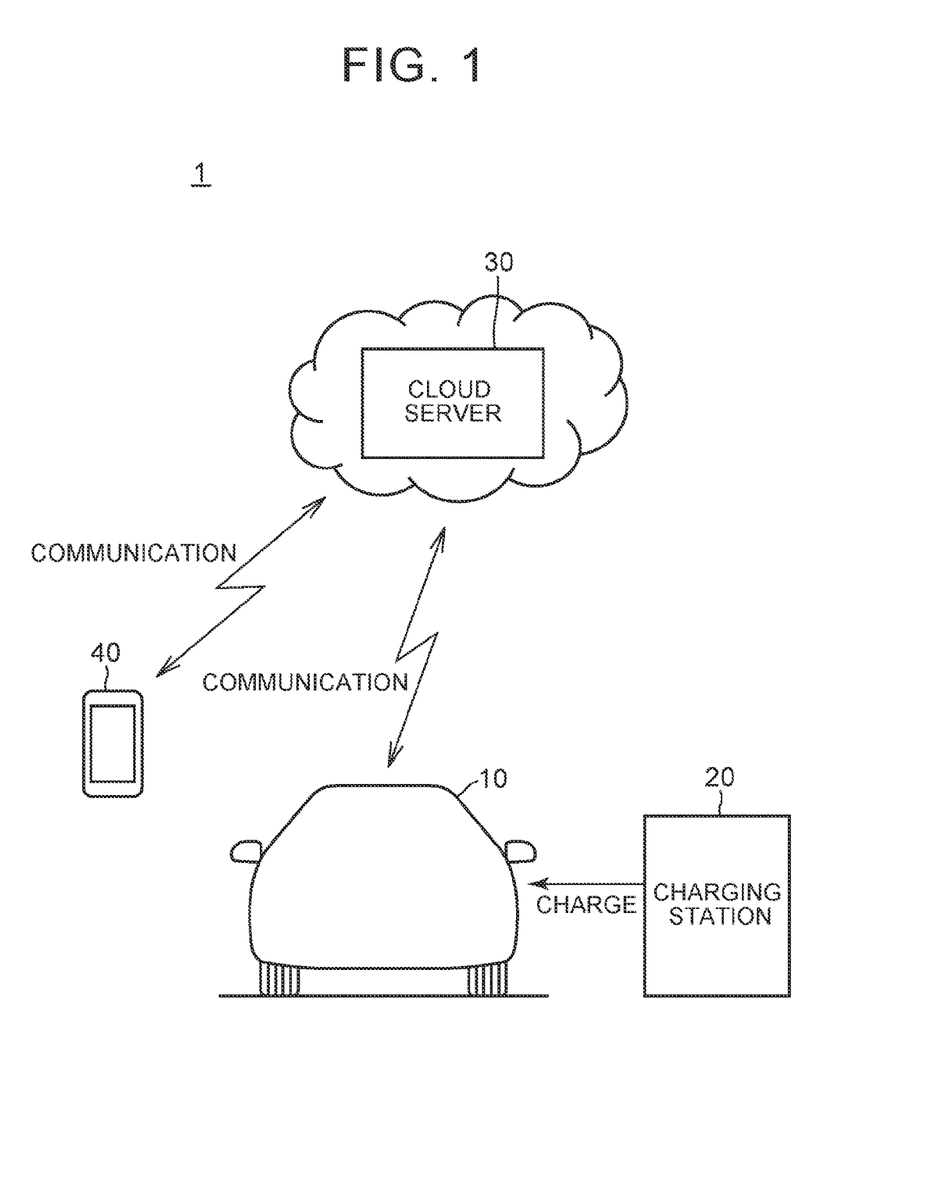
FIG. 1 is a view showing the overall configuration of a vehicle charging system according to a first embodiment.

FIG. 1 shows the overall configuration of a vehicle charging system in which a charge control system according to a first embodiment is used. Referring to FIG. 1, the vehicle charging system 1 includes a vehicle 10, a charging station 20, a cloud server 30, and a mobile terminal 40. In the first embodiment, the cloud server 30 corresponds to one example of "a learning unit", "a creating unit" and "an obtaining unit" according to the present disclosure.

The vehicle 10 is configured to be supplied with electric power from the charging station 20 located outside the vehicle, such that a vehicle-mounted power storage device (not shown) can be charged. As one example, a charging connector provided at a distal end of a charging cable that extends from the charging station 20 is connected to an inlet of the vehicle 10, so that the vehicle 10 receives electric power from the charging station 20. The vehicle 10 may also receive electric power, by use of a power receiving coil installed on the vehicle 10 for contactlessly receiving electric power via an electromagnetic field from a power transmitting coil to which AC power is supplied from the charging station 20. For example, the vehicle 10 is an electric vehicle, such as a hybrid vehicle or an electric automobile, which can travel using electric power stored in a power storage device.

The vehicle 10 is configured to be able to communicate with the cloud server 30 via a communicating means (not shown). The vehicle 10 transmits information on the vehicle 10 necessary for the cloud server 30 to create a charge schedule of charging the power storage device from the charging station 20, to the cloud server 30. The information transmitted from the vehicle 10 to the cloud server 30 will be described in detail later.

The charge schedule is a time schedule of charging of the power storage device from the charging station 20, and includes a charge start time, a charge end time, etc., which are set in view of a length of time required for charging the power storage device, electricity cost on charge, and a length of waiting time in a fully charged state before departure of the vehicle.

The vehicle 10 receives the charge schedule of charging the power storage device from the charging station 20, which schedule was created by the cloud server 30, from the cloud server 30. In the vehicle 10, charging of the power storage device from the charging station 20 is performed according to the charge schedule. Alternatively, a charge execution command may be transmitted from the cloud server 30 to the vehicle 10, according to the created charge schedule, and charging of the power storage device may be performed in the vehicle 10, in response to the charge execution command from the cloud server 30.

The charging station 20 is a power supply that supplies charging power to the vehicle 10. Charging stations 20 are provided at a plurality of charging sites, including the user's home, and locations, such as service areas and shopping centers, outside the home. Namely, the power storage device mounted on the vehicle 10 can be charged by use of the charging stations 20 at a plurality of charging sites.

The cloud server 30 is configured to be able to communicate with the vehicle 10 and the mobile terminal 40, via communication means (not shown). The cloud server 30 receives information (which will be described later) concerning the vehicle 10, from the vehicle 10. The information includes information concerning the charging station 20 used by the vehicle 10 (e.g., installation site (such as home, shopping center, or a service area), time of arrival at the charging station 20, time of departure from the charging station 20, etc.), and the cloud server 30 learns a period of stay of the vehicle 10 for each charging site at which the charging station 20 is installed, using the above-indicated information.

Further, when the vehicle 10 stays at any of the charging sites at which the charging stations 20 are installed, the cloud server 30 estimates the departure time of the vehicle 10, from the result of learning (a learned value(s) of the period of stay of the vehicle 10 at the charging site concerned) associated with the charging site (charging station 20) at which the vehicle 10 stays, and the arrival time of the vehicle 10. Then, the cloud server 30 creates the charge schedule of the vehicle 10, according to the estimated departure time, in view of the time required for charging of the power storage device, electricity cost on charge, reduction of the waiting time in the fully charged state, and so forth. The processing of the cloud server 30 will be described in detail later.

The mobile terminal 40, which can communicate with the cloud server 30, receives the charge schedule created by the cloud server 30, from the cloud server 30, and displays it on a display unit. In this manner, the user of the vehicle 10 can confirm the charge schedule of the vehicle 10 created by the cloud server 30, on the mobile terminal 40.

Figure 2:
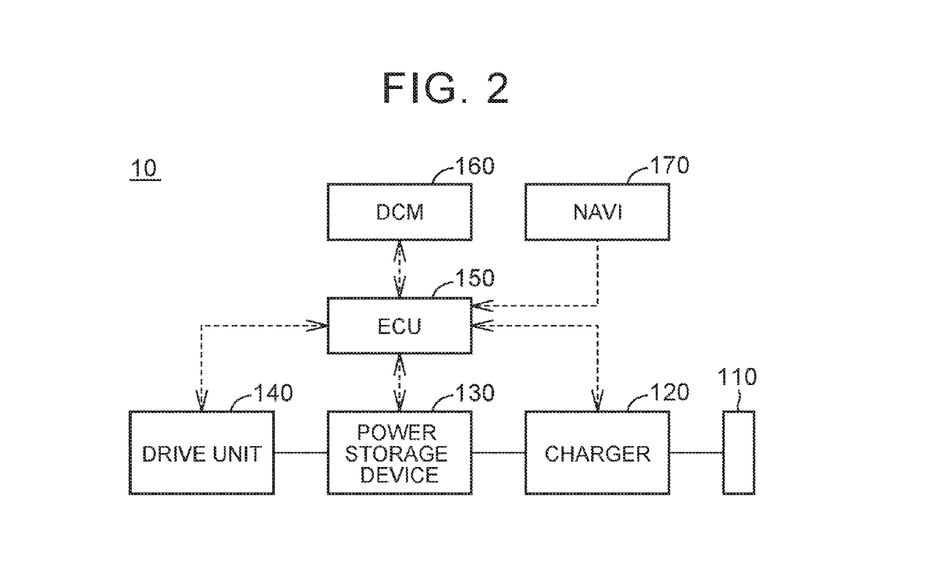
FIG. 2 is a block diagram schematically showing the configuration of a vehicle shown in FIG. 1.

FIG. 2 is a block diagram schematically showing the configuration of the vehicle 10 shown in FIG. 1. Referring to FIG. 2, the vehicle 10 includes a power receiving unit 110, charger 120, power storage device 130, drive unit 140, ECU (Electric Control Unit) 150, DCM (Data Communication Module) 160, and a navigation system 170.

The power receiving unit 110 consists principally of an inlet to which a charging connector provided at a distal end of a charging cable that extends from the charging station 20 (FIG. 1) can be connected. In the case where contactless or wireless power transfer using a power transmission coil electrically connected to the charging station 20 is employed, the power receiving unit 110 may consist principally of a power receiving coil that contactlessly receives electric power from the power transmission coil through an electromagnetic field.

The charger 120, which is controlled by the ECU 150, converts electric power received from the charging station 20, to a voltage level of the power storage device 130, and delivers the resulting power to the power storage device 130. The charger 120 includes a rectifier, an inverter, and so forth, for example.

The power storage device 130 can store electric power received from the charger 120, and supplies the stored power to the drive unit 140. For example, the power storage device 130 includes a secondary battery, such as a nickel hydride battery or a lithium-ion battery, or an electric double layer capacitor. The power storage device 130 can also store electric power generated by regenerative braking in the drive unit 140 during traveling of the vehicle.

The drive unit 140 generates driving force for driving drive wheels (not shown) so that the vehicle 10 travels. Although not illustrated in the drawings, the drive unit 140 includes a converter and inverter that are supplied with electric power from the power storage device 130, motors that are driven by the inverters so as to drive the drive wheels, and so forth. The drive unit 140 may include a generator that generates electric power for charging the power storage device 130, and an engine that can drive the generator.

The ECU 150 includes CPU (Central Processing Unit), memory, input/output buffer, etc. (all of which are not shown), and performs various controls on the vehicle 10. Typically, when the ignition key (or switch) is turned on, and start-up of a traveling system including the drive unit 140 is requested, the ECU 150 controls the drive unit 140 so as to perform traveling control of the vehicle 10.

Also, the ECU 150 collects information (which will be described later) concerning the vehicle 10, and transmits the information to the cloud server 30 (FIG. 1) via the DCM 160. Further, if the ECU 150 receives the charge schedule for charging the power storage device 130 from the charging station 20 installed at the charging site at which the vehicle 10 stays, from the cloud server 30, via the DCM 160, the ECU 150 performs charge control for charging the power storage device 130 with electric power received from the power receiving unit 110, according to the charge schedule. The ECU 150 monitors the state of charge (SOC) of the power storage device 130, and stops the charge control when the power storage device 130 is brought into the fully charged state.

The DCM 160 is a communication device that can wirelessly communicate with the cloud server 30. The DCM 160 can communicate various types of information with the cloud server 30. In the first embodiment, the DCM 160 transmits at least the information of the vehicle 10 collected by the ECU 150, to the cloud server 30. The DCM 160 also receives the charge schedule transmitted from the cloud server 30, and outputs it to the ECU 150.

The navigation system 170 outputs information on the current position of the vehicle 10, utilizing the GPS (Global Positioning System). Then, the current position information of the vehicle 10 is transmitted, as one item of the information concerning the vehicle 10, to the cloud server 30 via the DCM 160.

Figure 3:
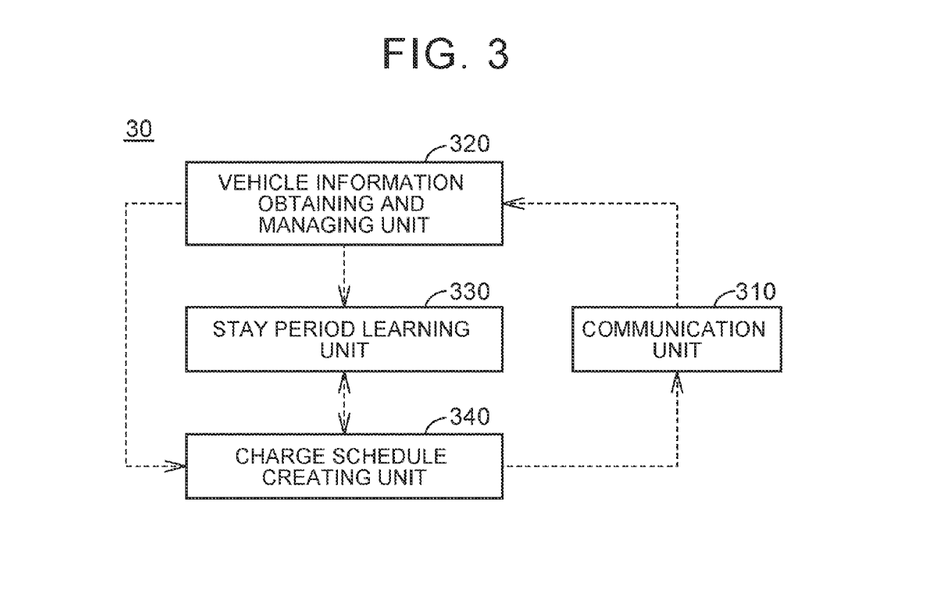
FIG. 3 is a block diagram functionally showing the configuration of a cloud server shown in FIG. 1.

FIG. 3 is a block diagram functionally showing the configuration of the cloud server 30 shown in FIG. 1. Referring to FIG. 3, the cloud server 30 includes a communication unit 310, a vehicle information obtaining and managing unit 320, a stay period learning unit 330, and a charge schedule creating unit 340. The communication unit 310 receives information concerning the vehicle 10, from the vehicle 10. Also, the communication unit 310 transmits the charge schedule created by the charge schedule creating unit 340, to the vehicle 10.

The vehicle information obtaining and managing unit 320 obtains the information concerning the vehicle 10, from the vehicle 10, via the communication unit 310, and manages the obtained information in association with the vehicle 10 and the charging station 20 (charging site).

Figure 4:
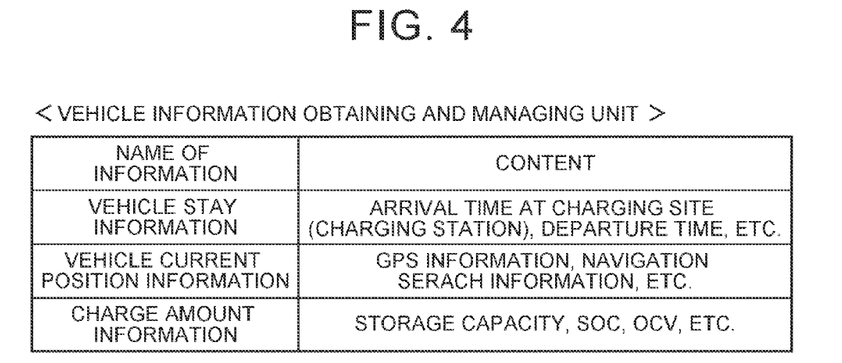
FIG. 4 is a view showing information obtained and managed by a vehicle information obtaining and managing unit shown in FIG. 3.

FIG. 4 shows the information obtained and managed by the vehicle information obtaining and managing unit 320 shown in FIG. 3. Referring to FIG. 4, the vehicle information obtaining and managing unit 320 obtains vehicle stay information, vehicle current position information, and charge amount information, as the information concerning the vehicle 10.

The vehicle stay information includes information, such as the time of arrival of the vehicle 10 at the charging site at which the charging station 20 is installed, and the time of departure of the vehicle 10 from the charging site. The vehicle stay information is transmitted, as the information concerning the vehicle 10, from the vehicle 10 to the cloud server 30, at the time when the vehicle 10 arrives at the charging site at which the charging station 20 is installed, and the time at which the vehicle 10 departs from the charging site, for example.

The vehicle stay information is managed for each charging site (each charging station 20). Namely, respective items of vehicle stay information associated with mutually different charging sites (charging stations 20) are managed as mutually different items of vehicle stay information. Also, the vehicle stay information is obtained from the vehicle 10 each time the vehicle 10 stays at the charging site (charging station 20).

The vehicle current position information includes GPS information (position information) of the vehicle 10, and destination search information of the navigation system 170 (FIG. 2), for example. While the vehicle current position information may be transmitted from the vehicle 10 to the cloud server 30 every minute or hour, it is transmitted, as the information concerning the vehicle 10, from the vehicle 10 to the cloud server 30, at least when the vehicle 10 arrives at the charging site at which the charging station 20 used by the vehicle 10 is installed.

The charge amount information includes information, such as the capacity (Wh), SOC (State Of Charge), OCV (Open Circuit Voltage), etc. of the power storage device 130 (FIG. 2) of the vehicle 10. While the charge amount information may be transmitted from the vehicle 10 to the cloud server 30 every minute or hour, it is transmitted, as the information concerning the vehicle 10, from the vehicle 10 to the cloud server 30, at least when the vehicle 10 arrives at the charging site at which the charging station 20 used by the vehicle 10 is installed.

Referring back to FIG. 3, the stay period learning unit 330 learns a period of stay of the vehicle 10 for each charging site (each charging station 20), using the vehicle stay information managed by the vehicle information obtaining and managing unit 320 for each charging site (each charging station 20).

Figure 5:
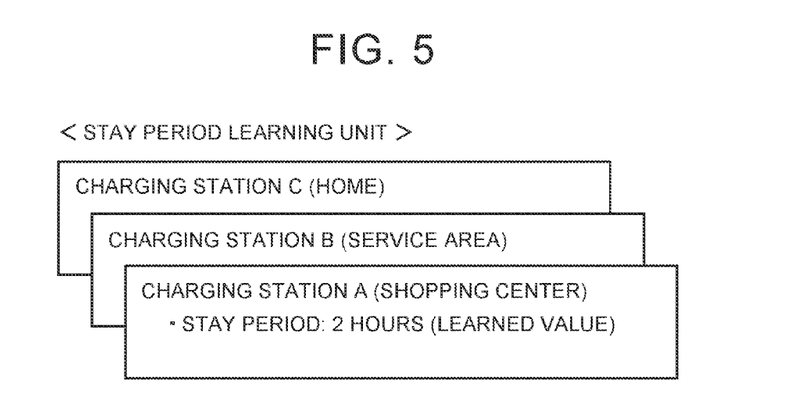
FIG. 5 is a view showing one example of learning result obtained by a stay period learning unit shown in FIG. 3.

FIG. 5 shows one example of learning result obtained by the stay period learning unit 330 shown in FIG. 3. Referring to FIG. 5, the stay period learning unit 330 learns a period of stay of the vehicle 10 at a charging station A (a certain shopping center at which the charging station A is provided), from past vehicle stay information (time of arrival at the site in question and time of departure from the site) associated with the shopping center.

Meanwhile, with regard to a charging station B different from the charging station A, the stay period learning unit 330 learns a period of stay of the vehicle 10 at the charging station B (a certain service area at which the charging station B is provided), from past vehicle stay information associated with the service area. Further, with regard to a charging station C provided at home, the stay period learning unit 330 learns a period of stay of the vehicle 10 at the charging station C (at home), from past vehicle stay information associated with the user's home.

Thus, the stay period learning unit 330 learns a period of stay of the vehicle 10 for each charging site (each charging station 20), using the vehicle stay information obtained and managed by the vehicle information obtaining and managing unit 320 for each charging site (each charging station 20).

Referring again to FIG. 3, the charge schedule creating unit 340 creates a charge schedule for charging the power storage device 130 of the vehicle 10 by the charging station 20. More specifically, when the vehicle 10 stays at any of a plurality of charging sites, such as the user's home, shopping centers, and service areas, at which the charging stations 20 are installed, the charge schedule creating unit 340 estimates the departure time of the vehicle 10, from the result of learning of the stay period learning unit 330 with respect to the charging site (charging station 20) at which the vehicle 10 stays, and the time of arrival of the vehicle 10 at the charging site (charging station 20).

Then, the charge schedule creating unit 340 creates the charge schedule for charging the power storage device 130 of the vehicle 10 from the charging station 20 installed at the charging site where the vehicle 10 stays, according to the estimated departure time of the vehicle 10. Various methods may be employed as a specific method of creating the charge schedule. For example, the charge schedule is created, using the departure time of the vehicle 10 as a condition, in view of the time required for charging the power storage device 130, electricity cost it takes during stay of the vehicle 10, reduction of the waiting time from completion of charging of the power storage device 130 (fully charged state) to the departure time, and so forth.

The time required for charging of the power storage device 130 can be determined based on the charge amount information obtained from the vehicle 10 and a predetermined charging rate. The electricity cost during stay of the vehicle 10 can be calculated from electric power price information provided from an electric power company, for example. The waiting time from completion of charging (fully charged state) of the power storage device 130 to the departure time should be minimized, for the sake of reduction or prevention of deterioration of the power storage device 130.

The charge schedule created by the charge schedule creating unit 340 is transmitted to the vehicle 10 via the communication unit 310. In the vehicle 10, charging of the power storage device 130 by the charging station 20 is performed according to the charge schedule. Alternatively, a charge execution command may be transmitted from the cloud server 30 to the vehicle 10, according to the charge schedule created by the charge schedule creating unit 340, and charging of the power storage device 130 may be performed in the vehicle 10, in response to the charge execution command.

Figure 6:
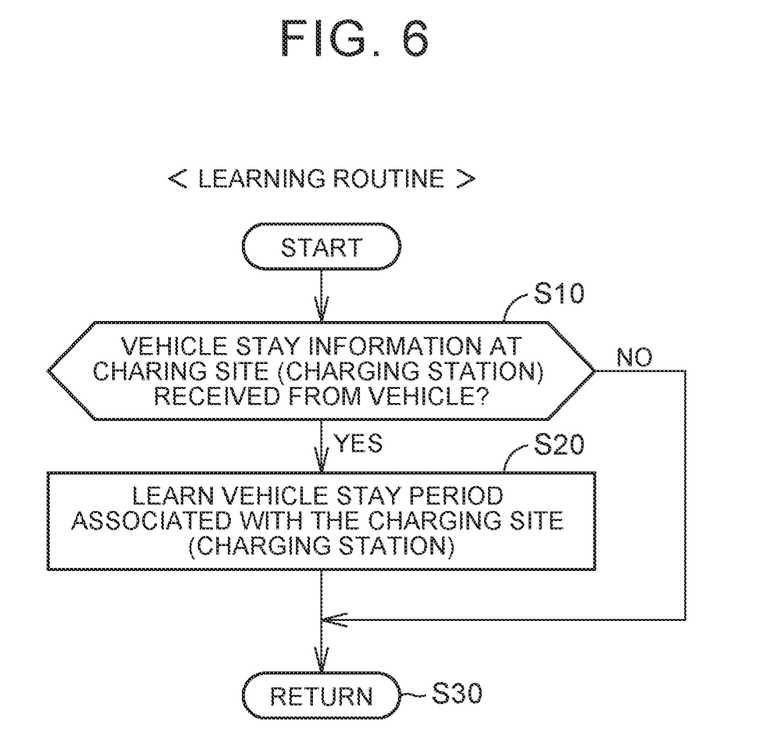
FIG. 6 is a flowchart illustrating the procedure of a learning routine executed in the cloud server.

FIG. 6 is a flowchart illustrating the procedure of a learning routine executed in the cloud server 30. Referring to FIG. 6, the cloud server 30 determines whether it has received vehicle stay information (FIG. 4) associated with the charging site at which the charging station 20 is installed, from the vehicle 10 (step S10). Here, the vehicle stay information is received from the vehicle 10, at the time when the vehicle 10 departs from the charging site at which charging was performed by the charging station 20, and the vehicle stay information includes at least the time of arrival at the charging site concerned and the time of departure from the charging site.

If it is determined in step S10 that the vehicle stay information has been received (YES in step S10), the cloud server 30 learns a period of stay of the vehicle 10 with respect to the charging site (charging station 20) indicated by the vehicle stay information (step S20). Namely, the cloud server 30 manages the vehicle stay information for each charging site (each charging station 20), and the period of stay of the vehicle 10 at the charging site (charging station 20) is learned for each charging site (each charging station 20). Then, the learning result is stored and retained for each charging site (each charging station 20).

Figure 7:
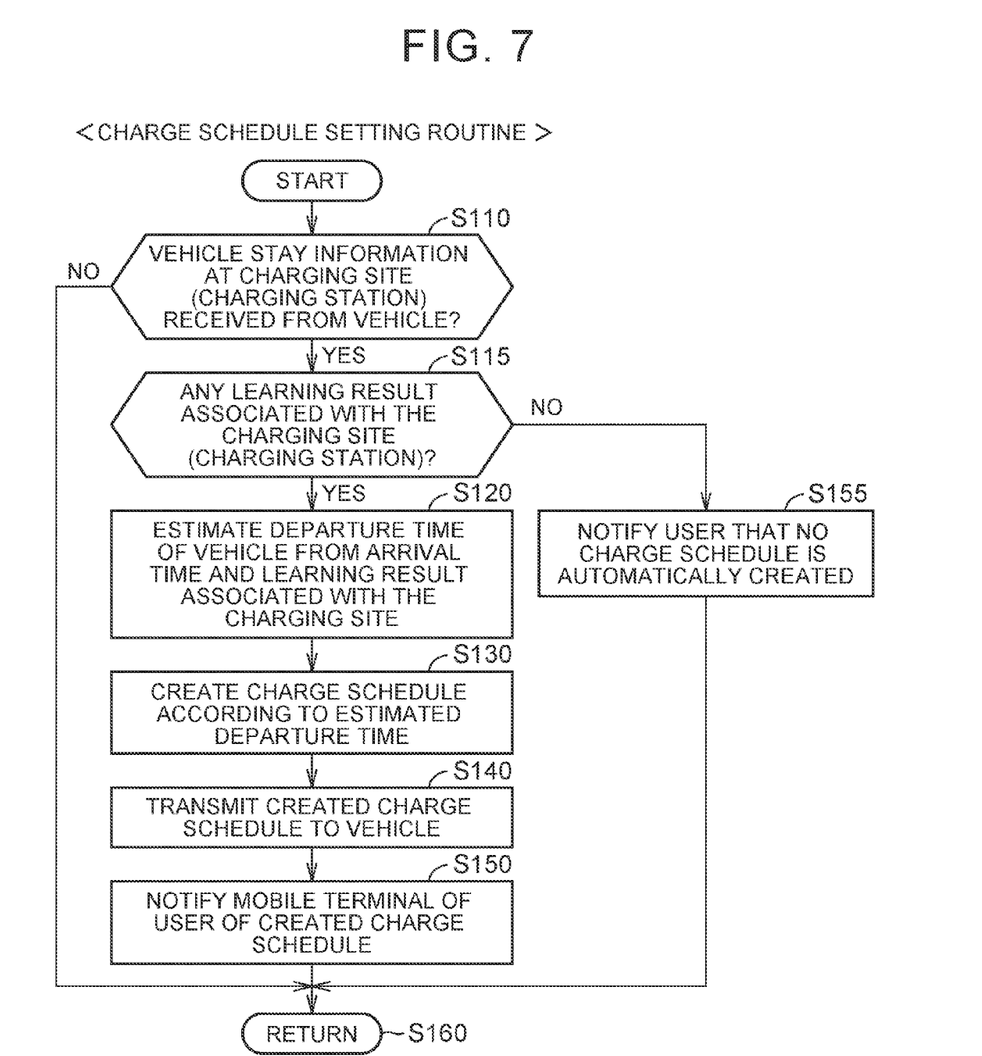
FIG. 7 is a flowchart illustrating the procedure of a charge schedule setting routine executed in the cloud server.

FIG. 7 is a flowchart illustrating the procedure of a charge schedule setting routine executed in the cloud server 30. Referring to FIG. 7, the cloud server 30 determines whether it has received the vehicle stay information (FIG. 4) associated with the charging site at which the charging station 20 is installed, from the vehicle 10 (step S110). Here, the vehicle stay information is received from the vehicle 10, at the time when the vehicle 10 arrives at the charging site at which charging is performed by the charging station 20, and the vehicle stay information includes at least the time of arrival at the charging site concerned.

If it is determined in step S110 that the vehicle stay information is not received (NO in step S110), the cloud server 30 proceeds to step S160 without executing a series of steps following step S110.

If it is determined in step S110 that the vehicle stay information has been received (YES in step S110), the cloud server 30 determines whether there is any learning result on the stay period of the vehicle 10 with respect to the charging site (charging station 20) concerned (step S115). If it is determined that there exists a learning result associated with the charging site (charging station 20) concerned (YES in step S115), the cloud server 30 estimates the departure time of the vehicle 10, from the learning result associated with the charging site (charging station 20) concerned, and the time of arrival at the charging site which is included in the vehicle stay information received in step S110 (step S120).

Then, the cloud server 30 creates a charge schedule of charging the power storage device 130 of the vehicle from the charging station 20, according to the departure time estimated in step S120, in view of the electricity cost it takes during stay of the vehicle, reduction of the waiting time from completion of charging of the power storage device 130 (fully charged state) to the departure time, and so forth (step S130).

Once the charge schedule is created, the cloud server 30 transmits the created charge schedule to the vehicle 10 (step S140). As a result, in the vehicle 10, charging of the power storage device 130 from the charging station 20 is performed, according to the charge schedule received from the cloud server 30.

Further, the cloud server 30 notifies the mobile terminal 40 (FIG. 1) of the user, of the created charge schedule (step S150). Thus, the user can confirm, on the mobile terminal 40, the charge schedule created according to the charging station 20 at which charging is performed. In the routine of FIG. 7, steps S140 and S150 may be executed at the same time, or may be executed in the order of step S150, step S140.

If it is determined in step S115 that there is no learning result associated with the charging site (charging station 20) concerned (NO in step S115), the cloud server 30 notifies the user that no charge schedule is automatically created (step S155). Alternatively, the cloud server 30 may notify the user that he/she is urged to manually set a charge schedule. The cloud server 30 may notify the user of the above information via the user's mobile terminal 40, or via the vehicle 10.

As described above, in the first embodiment, the stay period of the vehicle 10 is learned for each charging site at which the charging station 20 is installed. Then, when the vehicle 10 stays at any of a plurality of charging sites, the departure time of the vehicle 10 is estimated, using the learning result associated with the charging site. In this manner, the departure time of the vehicle 10 at each charging site can be estimated with high accuracy. Thus, according to the first embodiment, the accuracy of the charge schedule for each charging site can be improved.

In a second embodiment, charging sites are classified into some groups, according to characteristics of the charging sites (facilities) at which the charging stations 20 are provided. Then, charging suitable for the charging sites of each group is carried out.

Figure 8:
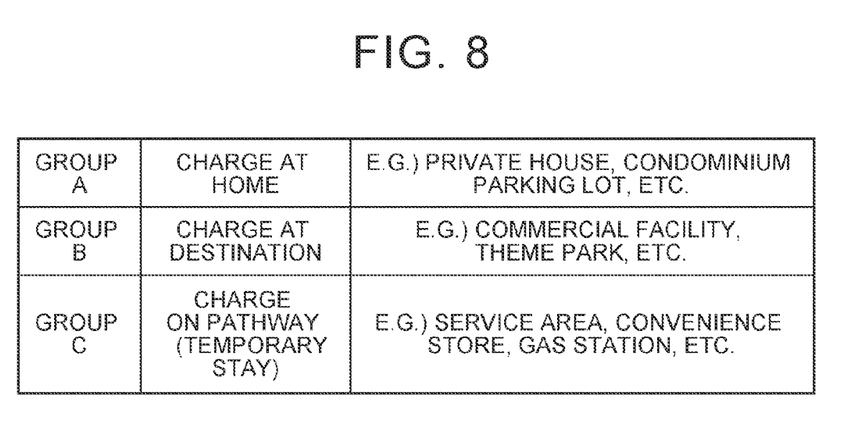
FIG. 8 is a view showing one example of groups of charging sites.

FIG. 8 shows one example of groups of charging sites. In the second embodiment, the charging sites are classified into three groups, i.e., Group A, Group B and Group C.

Charging sites, such as private houses and parking lots of condominium buildings, corresponding to charging at home can be classified as Group A. Charging sites, such as commercial facilities and theme parks, corresponding to charging at destinations other than the user's home can be classified as Group B. Charging sites corresponding to charging during a temporary stay on a traveling pathway can be classified as Group C. The temporary stay means stay of a sufficiently short period relative to those of Group A and Group B. For example, service areas, convenience stores, gas stations, etc., can be classified as Group C.

Which charging site at which the vehicle 10 is staying can be determined based on the vehicle current position information (including GPS information) obtained from the vehicle 10.

The overall configuration of a vehicle charging system according to the second embodiment is identical with the overall configuration according to the first embodiment shown in FIG. 1.

Figure 9:
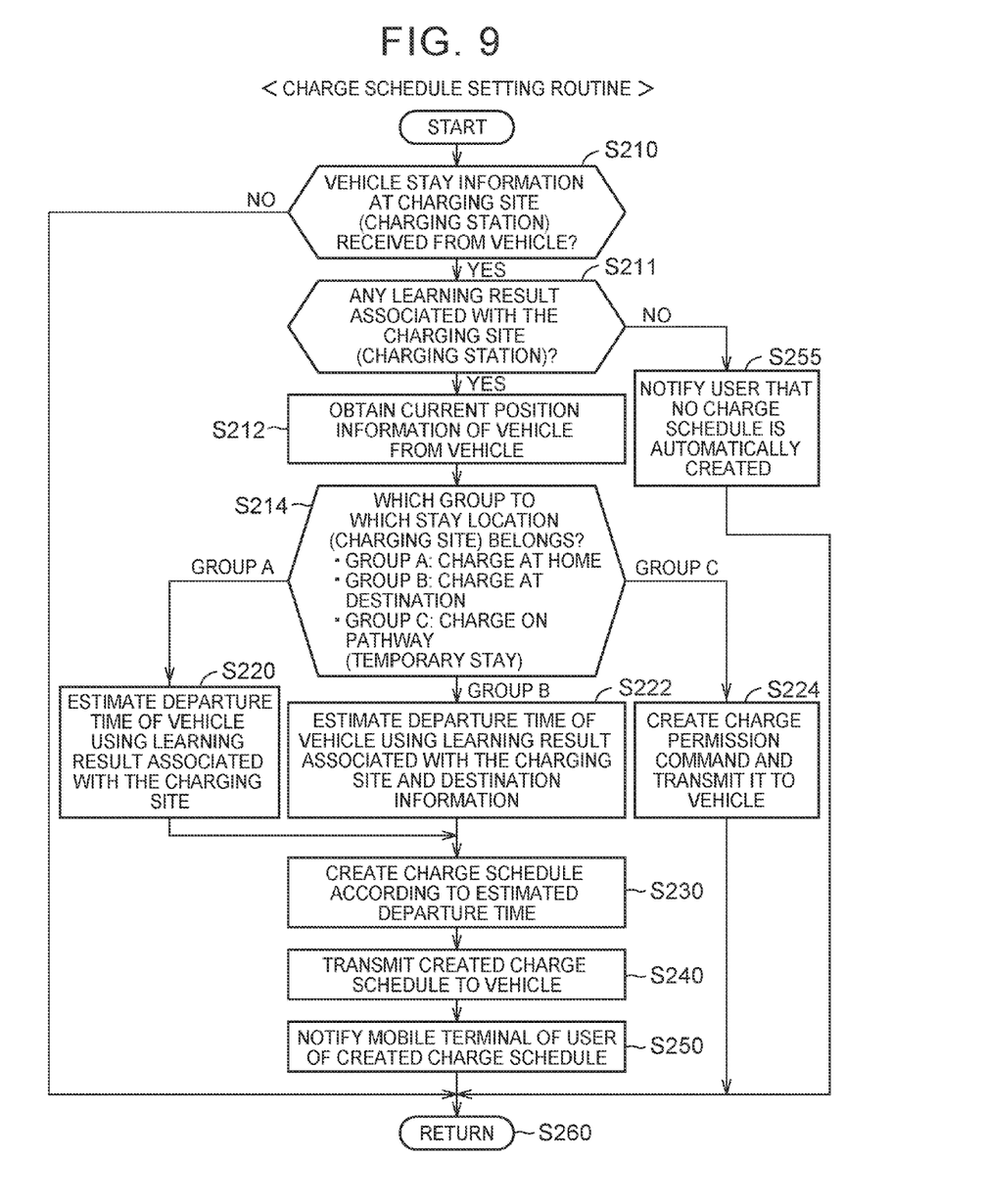
FIG. 9 is a flowchart illustrating the procedure of a charge schedule setting routine executed in a cloud server in a second embodiment.

FIG. 9 is a flowchart illustrating the procedure of a charge schedule setting routine executed in the cloud server 30 according to the second embodiment. Referring to FIG. 9, steps S210, S211, steps S230-S250, and step S255 shown in this flowchart are identical with steps S110, S115, steps S130-S150, and step S155 shown in FIG. 7, and therefore, explanation of these steps will not be repeated.

If it is determined in step S211 that there exists a learning result associated with the charging site (charging station 20) concerned (YES in step S211), the cloud server 30 obtains the current position information of the vehicle 10 from the vehicle 10 (step S212). The current position information of the vehicle 10 is detected by the navigation system 170 of the vehicle 10.

Then, the cloud server 30 determines which group of Group A, Group B, and Group C to which the current stay location (charging site) of the vehicle 10 belongs (step S214). If it is determined that the stay location (charging site) of the vehicle 10 belongs to Group A (corresponding to charging at home) ("GROUP A" in step S214), the cloud server 30 estimates the departure time of the vehicle 10, using the learning result on the stay period of the vehicle 10 with respect to the charging site (charging station 20) concerned (step S220). Then, the cloud server 30 proceeds to step S230.

If it is determined in step S214 that the stay location (charging site) of the vehicle 10 belongs to Group B (corresponding to charging at a destination other than home) ("GROUP B" in step S214), the cloud server 30 estimates the departure time of the vehicle 10, using the learning result on the stay period of the vehicle 10 with respect to the charging site (charging station 20) concerned, and destination information (such as business hours of a facility of the charging site). For example, when the departure time estimated based on the learning result on the stay period of the vehicle 10 is later than the end time of the business hours of the facility, the end time of the business hours of the facility may be estimated as the departure time.

Once the departure time of the vehicle 10 is estimated in step S220 or step S222, the cloud server 30 proceeds to step S230, and creates a charge schedule for charging the power storage device 130 of the vehicle 10 from the charging station 20, according to the estimated departure time. Steps S240, S250 subsequent to step S230 are identical with steps S140, S150 shown in FIG. 7, respectively.

If it is determined in step S214 that the stay location (charging site) of the vehicle 10 belongs to Group C (corresponding to charging during a temporary stay on a traveling pathway) ("GROUP C" in step S214), the cloud server 30 creates a command to permit charging of the power storage device 130 by the charging station 20, and sends the command to the vehicle 10, without creating any charge schedule of the vehicle 10 (step S224). As a result, in the vehicle 10, once the charging connector of the charging station 20 is connected to the inlet of the vehicle 10, charging of the power storage device 130 by the charging station 20 is immediately carried out. After execution of step S224, the cloud server 30 proceeds to step S260.

As described above, in the second embodiment, the charging sites are classified into groups A to C, according to characteristics of the charging sites (facilities) at which the charging stations 20 are provided. Then, if it is determined that the stay location (charging site) of the vehicle 10 belongs to Group C (equivalent to charging during a temporary stay on a traveling pathway), no charge schedule is created, but a command to permit charging of the power storage device 130 by the charging station 20 is created and transmitted to the vehicle 10. Thus, according to the second embodiment, it is possible to avoid a situation where charging of the power storage device 130 by the charging station 20 has not been started at the time of departure of the vehicle 10, at the charging site (Group C) where the vehicle 10 is supposed to stay temporarily. The statement that "the vehicle stays temporarily" means that the period of stay is sufficiently short relative to that of stay at home or a destination. For example, the stay locations of Group C include locations where the vehicle is supposed to stay for the purpose of charging the vehicle, and locations where charge may not be completed at the end of stay even if the charge is started at the start of the stay. The stay locations of Group C include service areas, convenience stores, gas stations, etc. on traveling pathways, for example.

In each of the above-described embodiments, the stay period of the vehicle 10 is learned for each charging site, and the charge schedule of the vehicle 10 is created, based on the departure time estimated using the learning result. However, in addition to creation of the charge schedule, preliminary air conditioning of the vehicle 10, warm-up of the power storage device 130, etc. may be performed in accordance with the departure time of the vehicle 10. Since the accuracy in estimation of the departure time of the vehicle 10 can be improved through learning for each charging site, the accuracy in scheduling of preliminary air conditioning, warm-up of the power storage device 130, etc. in accordance with the departure time of the vehicle 10 is also improved.

Figure 10:
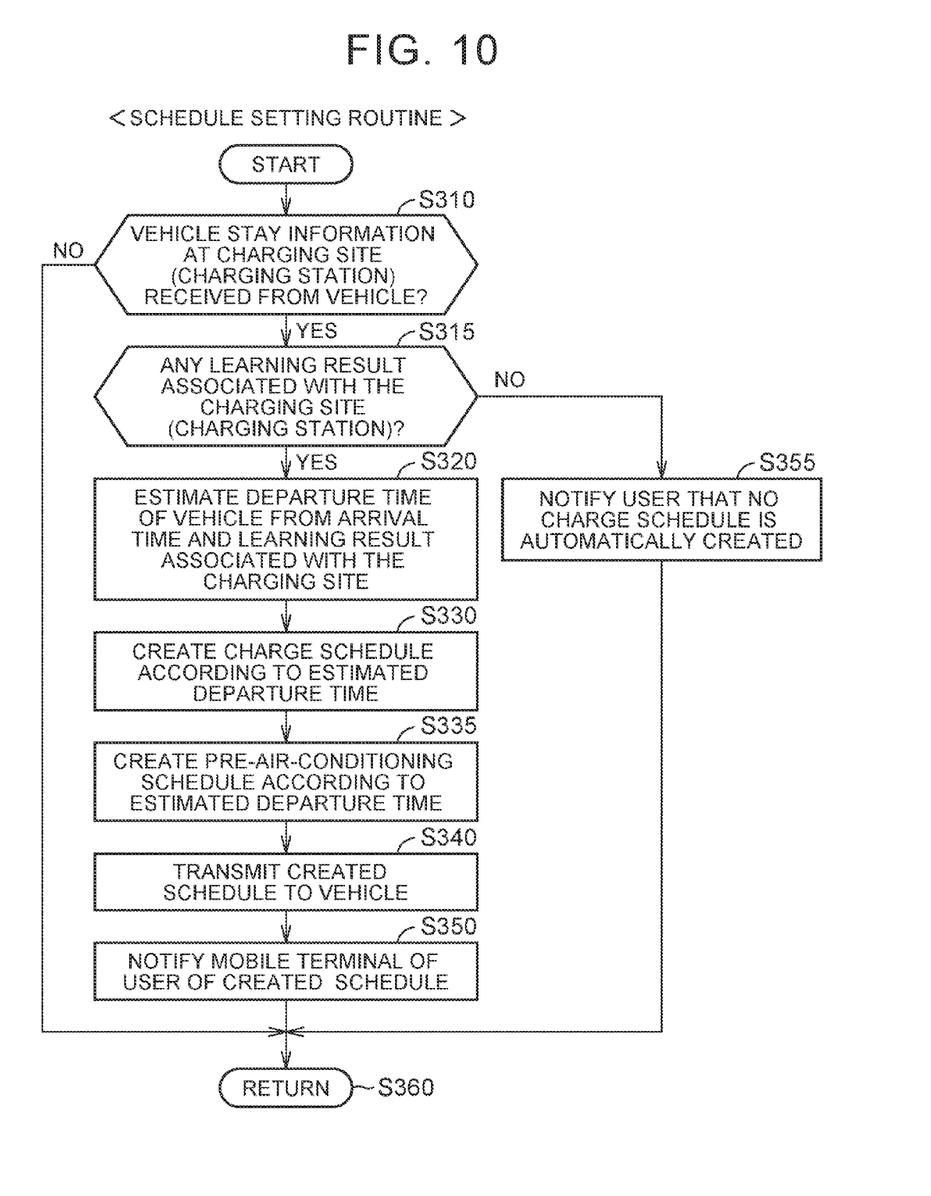
FIG. 10 is a flowchart illustrating the procedure of a schedule setting routine executed when a pre-air-conditioning schedule of the vehicle as well as a charge schedule is created.

FIG. 10 is a flowchart illustrating the procedure of a schedule setting routine executed when a pre-air-conditioning schedule of the vehicle 10 is created in addition to the charge schedule. Referring to FIG. 10, steps S310-S330 and S355 shown in this flowchart are identical with steps S110-S130 and step S155 shown in FIG. 7, respectively, and therefore, explanation of these steps will not be repeated.

Once the charge schedule of the vehicle 10 is created in step S330, the cloud server 30 creates a schedule of preliminary air conditioning performed in the vehicle 10, according to the departure time estimated in step S320 (step S335). Then, the cloud server 30 transmits the charge schedule created in step S330, and the pre-air-conditioning schedule created in step S335, to the vehicle 10 (step S340). As a result, in the vehicle 10, charging of the power storage device 130 from the charging station 20 is performed based on the charge schedule created by the cloud server 30, and preliminary air conditioning prior to departure is performed based on the pre-air-conditioning schedule created by the cloud server 30.

Further, the cloud server 30 notifies the mobile terminal 40 (FIG. 1) of the user of the charge schedule created in step S330, and the pre-air-conditioning schedule created in step S335 (step S350). As a result, the user can confirm the charge schedule created according to the charging station 20 at which charging is performed, and the pre-air-conditioning schedule, on the mobile terminal 40. Steps S340, S350 may be executed at the same time, or may be executed in the order of step S350, step S340.

Figure 11:
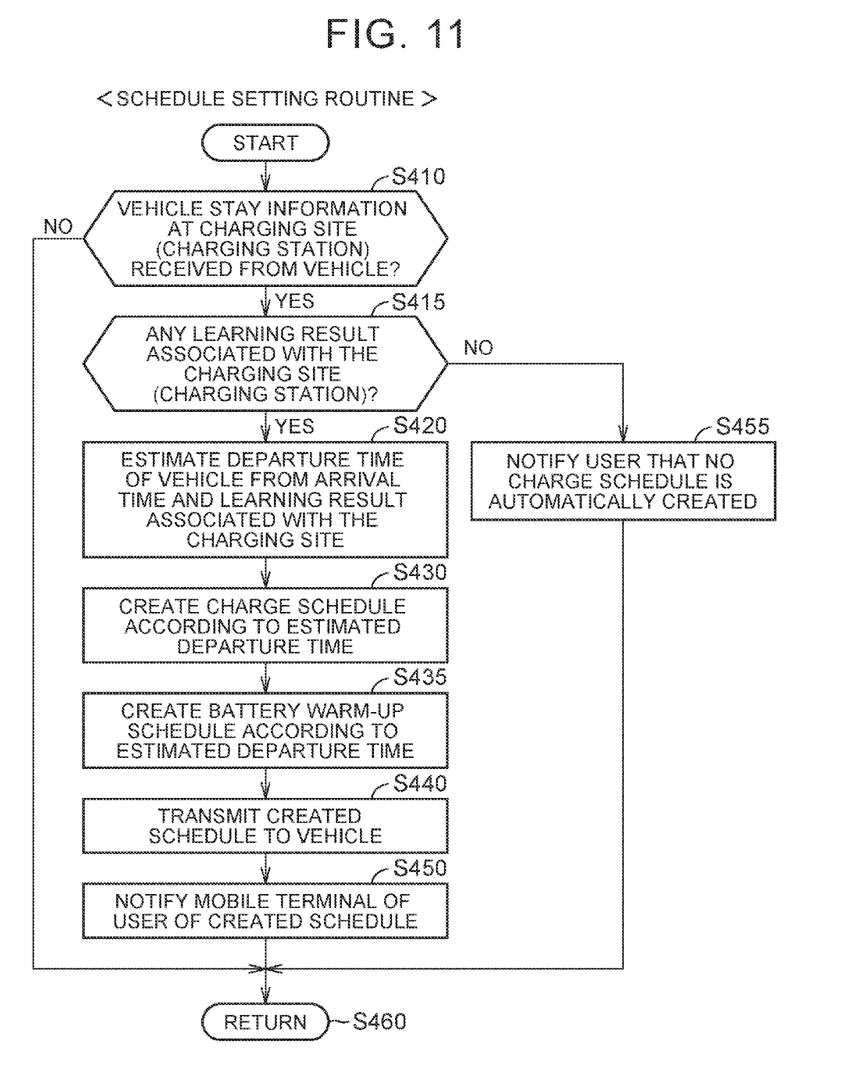
FIG. 11 is a flowchart illustrating the procedure of a schedule setting routine executed when a warm-up schedule as well as a charge schedule for a power storage device is created.

FIG. 11 is a flowchart illustrating the procedure of a schedule setting routine executed when a warm-up schedule as well as the charge schedule for the power storage device 130 is created. Referring to FIG. 11, steps S410-S430 and step S455 shown in this flowchart are identical with steps S110-S130 and step S155 shown in FIG. 7, respectively, and therefore, explanation of these steps will not be repeated.

Once the charge schedule of the vehicle 10 is created in step S430, the cloud server 30 creates a schedule of raising the temperature of the power storage device 130 in the vehicle 10, according to the departure time estimated in step S420 (step S435). The warm-up of the power storage device 130 prior to departure is performed so as to ensure battery output when the vehicle starts traveling. The temperature of the power storage device 130 may be raised by means of a heater provided separately from the device 130, or may be raised by causing forced charge or discharge of the power storage device 130 (for example, by causing electric power to be supplied and received between the power storage device 130 and an auxiliary battery, or the like).

Then, the cloud server 30 transmits the charge schedule created in step S430, and the warm-up schedule of raising the temperature of the power storage device 130, which is created in step S435, to the vehicle 10 (step S440). Thus, in the vehicle 10, the power storage device 130 is charged from the charging station 20, based on the charge schedule created in the cloud server 30, and warm-up of the power storage device 130 prior to departure is performed, based on the warm-up schedule created by the cloud server 30.

Further, the cloud server 30 notifies the mobile terminal 40 (FIG. 1) of the user of the charge schedule created in step S430, and the warm-up schedule for the power storage device 130 created in step S435 (step S450). As a result, the user can confirm the charge schedule created according to the charging station 20 at which charging is performed, and the warm-up schedule for the power storage device 130, on the mobile terminal 40. Steps S440, S450 may be executed at the same time, or may be executed in the order of step S450, step S440.

While the modified examples of the first embodiment have been illustrated above, preliminary air conditioning of the vehicle 10, warm-up of the power storage device 130, etc. may be carried out in addition to creation of the charge schedule, in the same manner as described above, as modified examples of the second embodiment.

While the learning routine and the charge schedule setting routine are performed in the cloud server 30, in each of the above-described embodiments, the location where these routines are performed is not limited to the cloud server 30. For example, each of the above-described routines may be executed in the ECU 150 of the vehicle 10.

What is claimed is:

1. A charge control system that creates a charge schedule for charging a power storage device installed on a vehicle, the power storage device being charged from a power supply located outside the vehicle, the vehicle being configured to allow charging of the power storage device from the power supply at a plurality of charging sites, the charge control system comprising:
   a vehicle information obtaining and managing unit configured to receive vehicle stay information, the vehicle stay information including, for a specific charging site of the plurality of charging sites, a time of arrival of the vehicle at said specific charging site and a time of departure of the vehicle from the specific charging site during one or more previous stays by the vehicle at the specific charging site;
   a learning unit configured to learn, from the vehicle stay information, a stay period of the vehicle for the specific charging site of the plurality of charging sites, the learned stay period for the specific charging site being based on a length of time between arrival of the vehicle at the specific charging site and departure of the vehicle from the specific charging site during one or more previous stays at the specific charging site; and
   a creating unit configured to estimate, for a current stay at the specific charging site, a departure time of the vehicle from the specific charging site, the departure time being estimated from the learned stay period for the specific charging site and an arrival time of the vehicle at the specific charging site for the current stay at the specific charging site, and the creating unit being configured to create the charge schedule based on the estimated departure time for the current stay at the specific charging site to reduce a waiting time from completion of charging of the power storage device of said vehicle during the current stay and the estimated departure time of the vehicle from the specific charging site for the current stay.

2. The charge control system according to claim 1, wherein
   the vehicle information obtaining and managing unit is further configured to receive current position information of the vehicle, and
   the creating unit is configured to create a command to permit charging of the power storage device from the power supply without creating the charge schedule, when the current position information indicates that the vehicle is located at a temporary charging site, the temporary charging site being a charging site that the vehicle is supposed to stay temporarily.

3. The charge control system according to claim 1, wherein
   the creating unit is further configured to create a preliminary air conditioning schedule for the vehicle based on the estimated departure time of the vehicle.

4. The charge control system according to claim 1 wherein
   the creating unit is further configured to perform create a warm-up schedule for the power storage device of the vehicle based on the estimated departure time of the vehicle.

5. The charge control system according to claim 1 wherein
   the vehicle information obtaining and managing unit is configured to receive vehicle stay information for a plurality of specific charging sites of the plurality of charging sites, the vehicle stay information including a time of arrival of the vehicle at each of the specific charging sites and a time of departure of the vehicle from each of the specific charging sites during one or more previous stays by the vehicle at each of the specific charging site, the learning unit is configured to learn, from the vehicle stay information, a stay period of the vehicle for each of the specific charging sites, and the creating unit is configured to estimate, for a current stay at one of the specific charging sites, a departure time of the vehicle from the one of the specific charging sites, the departure time being estimated from the learned stay period for the one of the specific charging sites, an arrival time of the vehicle at the one of the specific charging sites for the current stay, and the creating unit is configured to create the charge schedule based on the estimated departure time for the current stay at the one of the specific charging sites to reduce a waiting time from completion of charging of the power storage device of said vehicle during the current stay and the estimated departure time of the vehicle from the one of the specific charging sites for the current stay.

\* \* \* \* \*